United States Patent
Mei et al.

(10) Patent No.: US 11,153,242 B2
(45) Date of Patent: Oct. 19, 2021

(54) AUTOMATED PREVENTION OF SENDING OBJECTIONABLE CONTENT THROUGH ELECTRONIC COMMUNICATIONS

(71) Applicant: INTERNATIONAL BUSINESS MACHINES CORPORATION, Armonk, NY (US)

(72) Inventors: Lijun Mei, Beijing (CN); Qi Cheng Li, Beijing (CN); Xin Zhou, Beijing (CN); Ya Bin Dang, Beijing (CN); Hao Chen, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/194,999

(22) Filed: Nov. 19, 2018

(65) Prior Publication Data

US 2020/0162412 A1    May 21, 2020

(51) Int. Cl.
*H04L 12/58*    (2006.01)
*G06N 3/08*    (2006.01)
*G06N 3/04*    (2006.01)
(Continued)

(52) U.S. Cl.
CPC .......... *H04L 51/12* (2013.01); *G06N 3/0454* (2013.01); *G06N 3/084* (2013.01); *G06N 5/02* (2013.01); *G06N 20/00* (2019.01); *G06N 3/088* (2013.01)

(58) Field of Classification Search
CPC ...... H04L 51/12; G06N 3/084; G06N 3/0454; G06N 3/088; G06N 20/00; G06N 5/02
(Continued)

(56) References Cited

U.S. PATENT DOCUMENTS 9,736,100 B2     8/2017   Kaplinger et al.
2013/0159054 A1*  6/2013   Evans ............... G06Q 30/0202
                                                          705/7.31
(Continued)

FOREIGN PATENT DOCUMENTS

CN      105450853 A    3/2016
CN      106375377 A    2/2017

OTHER PUBLICATIONS ip.com, "Intelligently avoid sending instant messages inadvertently to unintended recipients", ip.com Disclosure No. IPCOM000251785D. Dec. 4, 2017. Text Preview. pp. 1-2.
(Continued)

*Primary Examiner* — Chris Parry
*Assistant Examiner* — Weiwei Y Stiltner
(74) *Attorney, Agent, or Firm* — Tutunjian & Bitetto, P.C.; Joseph Petrokaitis

(57) ABSTRACT

A computer implemented method of pre-emptively blocking an electronic communication is provided. The computer implemented method includes inputting an electronic communication history, wherein the electronic communication history includes a plurality of electronic communications and a set of corresponding recipients for each of the plurality of electronic communications. The computer implemented method further includes normalizing the plurality of electronic communications, and extracting a topic from each of the plurality of electronic communications. The computer implemented method further includes clustering the plurality of electronic communications according to the extracted topics, and digesting the plurality of electronic communication to form a positive learning data set and a negative learning data set to train a neural network. The computer implemented method further includes training the neural network on the positive learning data set and the negative learning data set, and preparing a positive neutral network model and a negative neural network model.

20 Claims, 8 Drawing Sheets

(51) Int. Cl.
*G06N 20/00* (2019.01)
*G06N 5/02* (2006.01)

(58) Field of Classification Search
USPC .......................................... 709/206
See application file for complete search history.

(56) References Cited

U.S. PATENT DOCUMENTS

| | | |
|---|---|---|
| 2014/0359022 A1* | 12/2014 | Buddenbaum .......... H04L 51/04 |
| | | 709/206 |
| 2016/0350651 A1* | 12/2016 | Devarajan ................ G06F 40/20 |
| 2017/0004408 A1* | 1/2017 | Edelen .................... G06N 5/02 |
| 2018/0109574 A1* | 4/2018 | Vigoda ................ G06Q 10/101 |
| 2018/0246873 A1* | 8/2018 | Latapie ................. G06F 17/274 |
| 2019/0057310 A1* | 2/2019 | Olmstead .............. G06F 17/271 |
| 2019/0199656 A1* | 6/2019 | Foerster .................. H04L 51/02 |
| 2019/0228368 A1* | 7/2019 | Peck .............. G06Q 10/063116 |
| 2019/0286451 A1* | 9/2019 | Awadallah .......... G06F 17/2765 |
| 2019/0294960 A1* | 9/2019 | Niemi ..................... G06F 21/44 |
| 2020/0134009 A1* | 4/2020 | Zhao ..................... G06F 40/186 |

OTHER PUBLICATIONS ip.com, "A method to avoid sending chat messages to wrong persons or groups", ip.com Disclosure No. IPCOM000251874D. Dec. 8, 2017. Text Preview. p. 1.

ip.com, "System to prevent inappropriate message from being sent out by referring to users' relation", ip.com Disclosure No. IPCOM000251773D. Dec. 4, 2017. Text Preview. p. 1.

* cited by examiner

AUTOMATED PREVENTION OF SENDING OBJECTIONABLE CONTENT THROUGH ELECTRONIC COMMUNICATIONS

BACKGROUND

Technical Field

The present invention generally relates to neural networks, and more particularly to neural networks for automated text and image categorization.

Description of the Related Art

An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN can be configured for a specific application, such as pattern recognition or data classification, through such a learning process.

SUMMARY

In accordance with an embodiment of the present invention, a computer implemented method of pre-emptively blocking an electronic communication is provided. The computer implemented method includes inputting an electronic communication history, wherein the electronic communication history includes a plurality of electronic communications and a set of corresponding recipients for each of the plurality of electronic communications. The computer implemented method further includes normalizing the plurality of electronic communications, and extracting a topic from each of the plurality of electronic communications. The computer implemented method further includes clustering the plurality of electronic communications according to the extracted topics, and digesting the plurality of electronic communication to form a positive learning data set and a negative learning data set to train a neural network. The computer implemented method further includes training the neural network on the positive learning data set and the negative learning data set, and preparing a positive neutral network model and a negative neural network model.

In accordance with another embodiment of the present invention, a processing system is provided. The processing system includes a central processing unit (CPU), a graphics processing unit (GPU), and a bus electrically connected to and in electronic communication with the CPU and the GPU. The processing system further includes a neural network system including a normalizer configured to normalize stored electronic communications from a communication history, pre-existing electronic communications of a message thread, and/or a newly created electronic message, a content extractor configured to extract content from the electronic communications and the electronic message using key term identification and/or LDA, a cluster generator configured to generate clusters from the content of the electronic communications and the electronic message, and a message filterer configured to filter the electronic communications and the electronic message with or without attachments using one or more filter matrices.

In accordance with yet another embodiment of the present invention, a non-transitory computer readable storage medium comprising a computer readable program for pre-emptively blocking an electronic communication is provided. The computer readable program includes instructions for inputting an electronic communication history, wherein the electronic communication history includes a plurality of electronic communications and a set of corresponding recipients for each electronic communication, normalizing the plurality of electronic communications, extracting a topic from each of the plurality of electronic communications, clustering the plurality of electronic communications according to the extracted topics, digesting the plurality of electronic communication to form a positive learning data set and a negative learning data set to train a neural network, training the neural network on the positive learning data set and the negative learning data set, and preparing a positive neutral network model and a negative neural network model.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
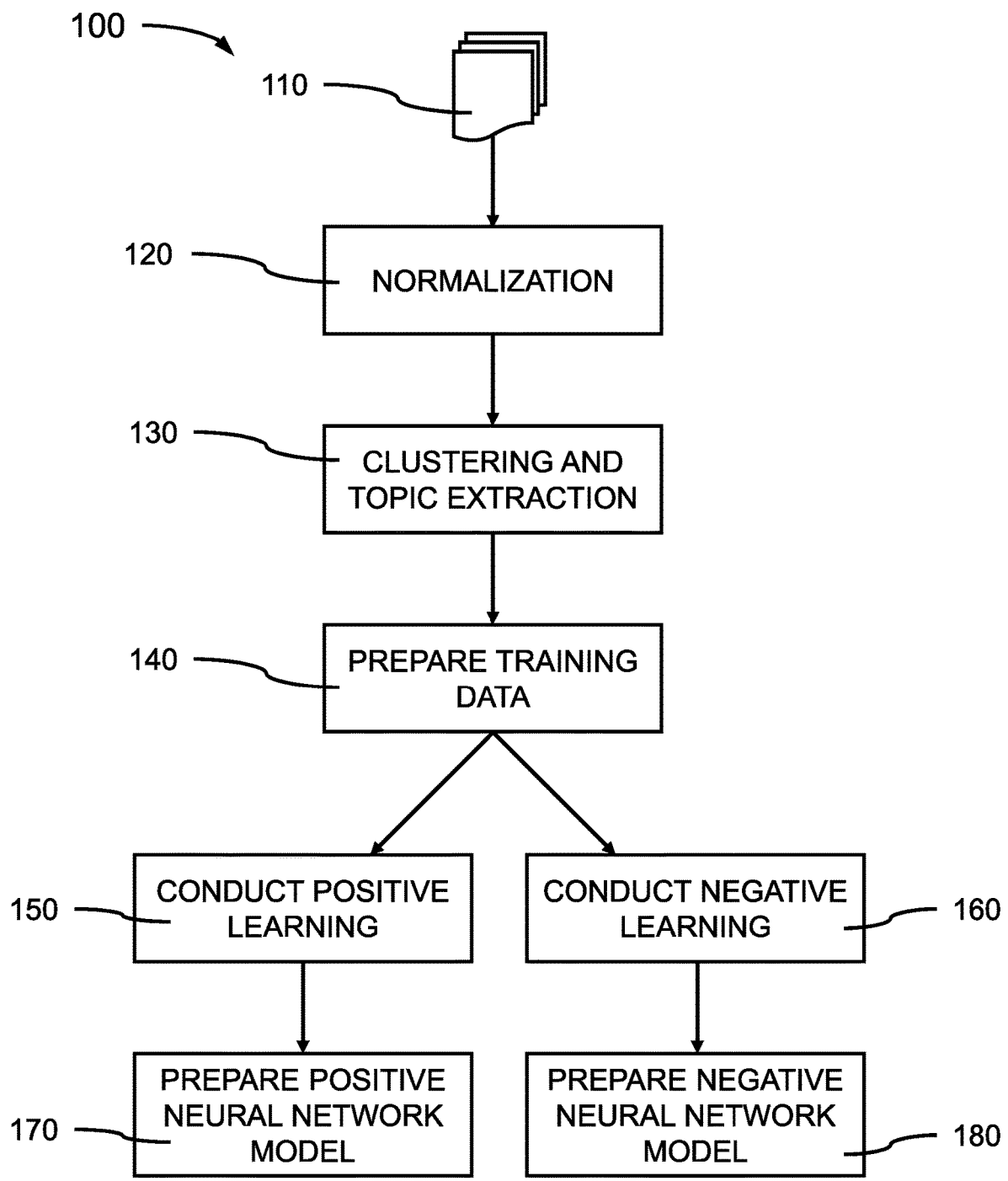
FIG. 1 is a block/flow diagram showing a training procedure for a neural network system for preventing or avoiding sending improper messages or sensitive information to recipients through electronic communication channels, in accordance with an embodiment of the present invention.

Embodiments of the present invention provide a method of preventing or avoiding sending improper messages or sensitive information to recipients through electronic communication channels, for example, using social messaging tools. Unlike snail-mail and hard-copy memos and letters, the ease with which a person can disseminate information using electronic communication channels, for example, e-mail, texting, and chat, to others has greatly increased the possibility of sending unintended material and/or sensitive information to multiple receivers. The ability created by electronic communications to almost instantaneously send an electronic message to multiple recipients by a single click or keystroke on a computer device has greatly increased the likelihood that information, images, or other content can be sent to unintended or incorrect receivers. Electronic messages also are difficult, if not impossible, to stop or retrieve once they have been sent, and unlike hard-copy messages, electronic messages can be delivered before an issue with the content is even discovered. Embodiments of the present invention address such problems by learning the sender's electronic messaging habits, and interceding when a message appears to be incongruent with the type of information and message topic(s) that would be sent to the list of recipients by automatically and pre-emptively blocking the electronic communication.

Embodiments of the present invention provide a method of recognizing when information, images, or other content in an electronic message should not be sent to one or more recipient addresses specified in the Addressee field of electronic messages. By analyzing chat logs, e-mail threads, and communication histories, a neural network can learn which electronic communications have been deemed appropriate by both senders and receivers, and which electronic communications have been deemed objectionable. The neural network can use such learning to determine if and when the contents of an electronic message are inappropriate or unsuited for the individual(s) or groups listed in the Addressee field of the electronic message. The method can, thereby, addresses the problems created by computer communication technology using computer technology based on neural networks. Automated prevention of sending objectionable content through electronic communications can avoid embarrassment of the sender or dissemination of sensitive material.

Embodiments of the present invention provide a system that can automatically analyze electronic messages for sensitive information or inappropriate content before the message(s) are communicated, and intervene before the information and/or content is disseminated to the addressees of the electronic message by pre-emptively blocking the electronic communication. In various embodiments, not every message being sent is interrupted to ask the user/sender if the message is acceptable to send. In various embodiments, the system can determine the likelihood that the message content is appropriate for each of the listed receivers, and present a warning to the sender if there is a likelihood that such content is not appropriate for each and every intended recipient in the addressee field before transmission of the electronic message.

Exemplary applications/uses to which the present invention can be applied include, but are not limited to: e-mail servers, instant messaging and chat applications, social messaging tools and platforms, and other electronic message services that provide electronic communication capability.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

Referring now to the drawings in which like numerals represent the same or similar elements and initially to FIG. 1, a block/flow diagram showing a training procedure 100 for a neural network system for preventing or avoiding sending improper messages or sensitive information to recipients through electronic communication channels is shown, in accordance with an embodiment of the present invention.

In block 110, stored electronic communications, which can be previously sent electronic messages, including, but not limited to, e-mail threads, chat logs, and tweet threads, can be input into a neural network training scheme to train the neural network to recognize the relationship between acceptable message content corresponding to a set of recipients and unacceptable content corresponding to the same recipients. The electronic messages can include, for example, text portions, graphics and images, numeric data and information, and/or attachments including text, graphics, images, numeric data, and other information. Text portions can include written alpha-numeric elements of a message, such as typed language entered by a user of an electronic device. Digital graphics and images can include attached or embedded photographs, video clips, animated GIFs, drawings, and clip art, where the graphic(s) or image(s) can be in an acceptable digital format. Numeric data and information can include tables or lists of numbers or values, including, but not limited to, social security numbers, pin numbers, phone numbers, bank account numbers, etc.

In various embodiments, graphics, images, videos, and animations can be raster image files or vector image files, where the graphics and images can be in a format, for example, Joint Photographic Experts Group (JPEG), Moving Picture Experts Group (MPEG), flash video (FLV), Audio Video Interleave (AVI), Quick Time File Format (.mov), AMV video format (.amv), Portable Network Graphics (PNG), Graphics Interchange Format (GIF), Tagged Image File Format (TIFF), Photoshop Document (PSD), Portable Document Format (PDF), Encapsulated Postscript (EPS), Adobe Illustrator Document (AI), Adobe Indesign Document (INDD), bit map (BMP), or Raw Image Format (RAW).

In one or more embodiments, at least a portion of a user's electronic communications history of electronic messages can be converted into an input for a neural network, where text component(s) and digital graphics and image components can be extracted from the electronic messages, and the addressees corresponding to each of the corresponding electronic messages can be identified.

In block 120, the electronic message inputs can be normalized and/or scaled, where the components of the electronic messages may not have a defined range of values, or where the transformed values can span a wide range. Normalizing the values of the electronic messages can ensure the values fall within the domain of the neural network, where the normalization can also center the data values. In various embodiments, the input of the electronic messages can be normalized using Min-Max Normalization, where the input range can be linearly transformed to the interval $[0,1]$ (or alternatively $[-1,1]$). In various embodiments, the input of the electronic messages can be normalized using Z-Score Normalization, where the data can be transformed to have zero mean and unit variance. The normalization used can depend on the approach to backpropagation and/or the activation function(s) used by the neural network nodes. In addition, other normalization methods can be applied to the text portion of the electronic messages, including, but not limited to, removing stop-words from the text, where stop-words are words which are filtered out because the words do not contain significant meaning or add significant meaning to the text. Stop-words can include, for example, articles (e.g., an, the) prepositions (e.g., about, above, before, if, etc.), adverbs, (e.g., quickly, often, then, nicely, etc.), or conjunctions, (e.g., but, and. or, etc.). Embedding vectors can then be generated after the stop-words have been removed, where words or phrases from the vocabulary of the text are mapped to vectors of real numbers.

In various embodiments, an algorithm, for example, a vector space model or word2Vec® using a continuous bag-of-words or continuous skip-gram can be used to convert the text portion of an electronic message that is embedded or attached into a vector space that can be input into the neural network. The vector space of the text portion of an electronic message can then be normalized. Embedding vectors can be vectors of real numbers.

In one or more embodiments, attached and/or embedded digital graphics and images can be converted into input for the neural network and normalized if necessary. In various embodiments, an image may already be within a known range of values, for example, red-green-blue (RGB) pixel values (e.g., 0-255) or gray-scale values. The image values may be normalized to an interval of [0,1] or [−1,1].

In various embodiments, the input text can be checked for mis-spellings and typos to help correctly identify the word content of the electronic messages before the electronic message inputs are normalized and/or scaled. Unidentifiable words can be dropped from the electronic messages, and the message flagged as being incomplete. Incomplete messages can result in a lower confidence score due to lower level of understanding of the text portion of the electronic message. Such incomplete messages can be enriched using the context information from previous conversations.

In block 130, the topic of the electronic messages can be extracted by identifying key terms in a subject line of the electronic message, or multiple recurrences of the same term(s) with the body and/or attachment(s) of the electronic message. The key terms can be used to create a catalog of labels. In various embodiments, Latent Dirichlet Allocation (LDA) can be used for topic modelling. The LDA can be utilized to extract the main topics (represented as a set of words) that occur in a collection of the electronic communications by unsupervised learning. The LDA can build a topic per document model and words per topic model, modeled as Dirichlet distributions.

In various embodiments, the vectors mapping the text can be clustered using a clustering algorithm, where the clustering algorithm can be an expectation maximization (EM) approach, a K-means approach (e.g., using MacQueen's algorithm, Hartigan's algorithm, etc.), or a Gaussian Mixture Model. After the clusters are generated, LDA can be used to extract key topics for each cluster.

In block 140, the training data for training the neural network can be prepared from the input electronic communications, where preparation of the training data can include building vocabularies of the terms used in the input electronic messages and categories or labels for the digital images and graphics can be established. The identification of categories or labels can depend on the types of images that can be searched for or expected to be reviewed in determining if the digital images constitute objectional subject matter, where objectionable subject matter determination can be based on known ethics, decorum, and/or etiquette standards (e.g., workplace behavior and harassment policies, professional ethics rules, criminal laws, etiquette books, etc.).

In various embodiments, the text portion(s) and the graphic and image portions of each of the electronic messages can be converted into a vector format, where the vectors can be formed by flattening out the pixels into a single column vector of dimension [D×1], where D is the number of values in a graphic or image. For example, a 100 pixel by 100 pixel RGB image would include 30,000 values that could form a [30,000×1] vector.

In one or more embodiments, the contacts list of the user/sender can also be used to correlate message content with known recipients to determine the appropriateness of the message content for each recipient of a message. The e-mail address or URL of the recipient(s) can be used to uniquely identify each recipient for each electronic communication in the user's electronic communications history, where an electronic communication includes an electronic message that has been sent to one or more addressee(s)/recipients.

In one or more embodiments, the contact list of the user/sender can be retrieved from the social messaging tool (e.g., e-mail, texting App, etc.). Through correlating the nick names identified in the communication history with their own contact list, each message can be labeled with its senders. The e-mail address or URL of the user/sender may also be extracted for comparisons.

In block 150, the neural network can learn positive outcomes, where the message content was found not to be objectionable to the recipients. In various embodiments, the responses of the recipients to each sent message can be used to determine whether and to what extent the recipients found the message contents to be objectionable. The text, images, and attachments of each addressee's reply can be analyzed in a manner similar to the user's electronic messages to identify positive responses that reinforce the sending of similar message content versus identifying negative responses that discourage the sending of similar message content. Through repeated comparison, the neural network can learn to predict likely response from known users to sent message content.

In block 160, the neural network can learn negative outcomes, where the message content was found to be objectionable to at least one of the recipients. In various embodiments, the responses of the recipients to each sent message can be used to determine whether and to what extent the recipients found the message contents to be objectionable. The text, images, and attachments of each addressee's reply can be analyzed in a manner similar to the user's sent electronic messages to identify a negative response that discourages the sending of similar message content to the particular recipient. Through repeated comparison, the neural network can learn to predict likely responses from known addressees to sent message content and calculate a confidence score regarding the likelihood that the sent message(s) would be found objectionable.

In various embodiments, each contact in a user's contact list can also have associated profile data, where the profile data can include the relationship that the addressee/contact has with the sender, for example, whether the addressee/contact is a close personal friend, an acquaintance, a close relative, a distant relative, a work associate, a work supervisor, a customer, a vendor, a client, etc. The user may be requested to input such profile data to identify the type of relationship each addressee/contact has with the sender/user, or the system may learn the relationship type from other information, such as the e-mail address (e.g., work e-mail address, public e-mail address, etc.), conversation topics (e.g., family birthdays, weddings, work assignments, etc.) or categories of attached images (e.g., sports cars or horses relating to a hobby, family photographs, work or technical images, etc.). In various embodiments, each addressee/contact may be associated with more than one relationship type, where a work associate may also be a close or distant relative or a close personal friend, etc.

In block 170, a learning algorithm can be applied to the normalized input data to train the neural network on positive outcomes. Training can involve determining or updating the weights of a positive outcome matrix, $M_P$, to be applied to a new electronic message. Training the neural network can produce a trained positive neural network model. The matrix, $M_P$, can be used as a filter to calculate a confidence value that the message is acceptable or objectionable to the addressee(s)/contact(s) identified in the message address field.

In block 180, a learning algorithm can be applied to the normalized input data to train the neural network on negative outcomes. Training can involve determining or updating the weights of a negative outcome matrix, $M_N$, to be applied to a new electronic message. Training the neural network can produce a trained negative neural network model. The matrix, $M_N$, can be used as a filter to calculate a confidence value that the message is acceptable or objectionable to the addressee(s)/contact(s) identified in the message address field.

Figure 2:
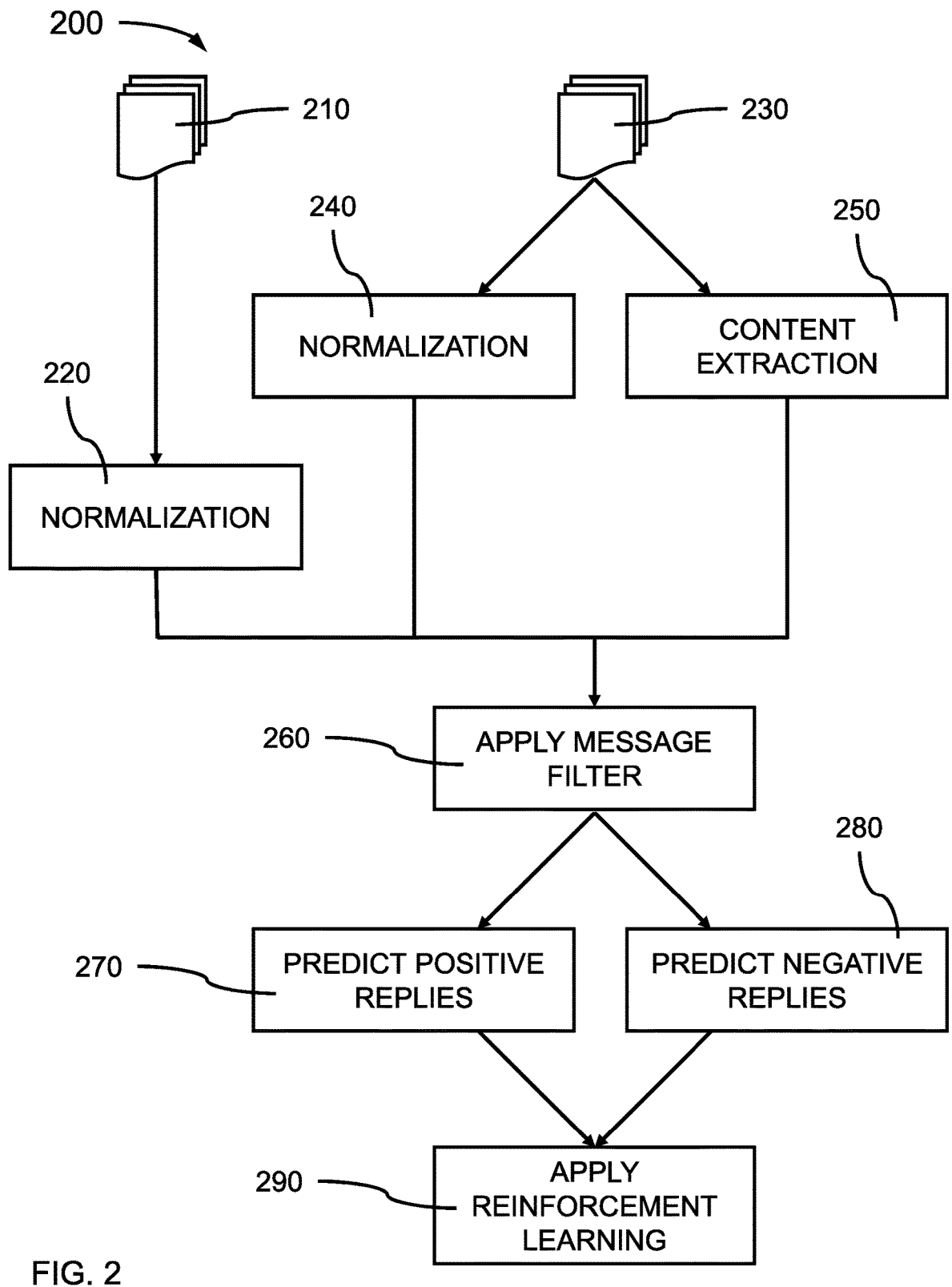
FIG. 2 is a block/flow diagram showing a neural network system implementing embodiments of the present approach to preventing or avoiding sending improper messages or sensitive information to receivers through electronic communication channels, in accordance with an embodiment of the present invention.

FIG. 2 is a block/flow diagram showing a method 200 of a neural network system implementing embodiments of the present approach to preventing or avoiding sending improper messages or sensitive information to receivers through electronic communication channels, in accordance with an embodiment of the present invention.

In block 210, the most current electronic message generated by the user can be input into the neural network. The most current electronic message can be the first electronic message in a new electronic communication thread, or the most recent electronic message in an ongoing electronic communication thread, where the newly created electronic message has not been transmitted to the recipients listed in the Addressee field.

In block 220, the newly created electronic message input into the neural network can be normalized and/or scaled in a manner as described for the training data used to train the neural network.

In block 230, the pre-existing electronic communications of an ongoing electronic communication thread can be input into the neural network. Each of one or more pre-existing electronic messages of the ongoing electronic communication thread can be input at the time of the user generating a new electronic message, where the user/sender is engaging in electronic communications with one or more recipients. The one or more pre-existing electronic messages of the current electronic communications thread can be input into a trained neural network system.

In block 240, each of the one or more pre-existing electronic messages of the ongoing electronic communication thread can be input into the neural network in a manner similar to the training data used to train the neural network. The electronic message inputs can be normalized and/or scaled in a manner similar to the training data used to train the neural network.

In block 250, the topic and content of each of the one or more pre-existing electronic messages can be extracted in a manner similar to the training data used to train the neural network.

In various embodiments, the addressee(s)/contact(s) identified in the message address field can be extracted from each of the one or more pre-existing electronic messages and the profile of the identified addressee(s)/contact(s) can be retrieved from the social messaging tool.

In block 260, a message filter can be applied to the newly created electronic message, where the message filter can identify whether the newly created electronic message is acceptable for all listed recipients or unacceptable for any of the listed recipients. A newly created electronic message that is identified as unacceptable for at least one of the listed recipients can trigger an alert to the sender that the electronic message should not be sent. The neural network can automatically interrupt the transmission of the electronic message based on the message content to prevent embarrassment or worse.

In various embodiments, the message filter can be a simple threshold filter that searches the newly created electronic message for black listed words or images, where a matrix calculation is not used to make the determination that the newly created electronic message is acceptable for all listed recipients or unacceptable for any of the listed recipients. In various embodiments, the message filter can determine that further processing is needed through checking whether the messaging is in a white list or a black list. If either a white list or a black list does not contain the message, then further processing is needed and the neural network can implement generating a confidence score for the newly created electronic message. The newly created message can be analyzed using the trained neural network to determine the probability (e.g., confidence score) that the newly created electronic message contains objectionable content for the listed recipients.

In one or more embodiments, the message filter can be a matrix, F, that includes weights applied to the vectors generated for the newly created electronic message and any attachments, that categorizes the newly created electronic message as acceptable for all listed recipients or unacceptable for at least one of the listed recipients. A message filter can be matrix $M_N$ or $M_P$.

One or more filter matrices can be applied to the different portions of the newly created electronic message to determine if a text portion, a graphics/image portion, and/or an attachment portion contains objectionable material based on the list of recipients in the addressee field of the newly created electronic message. In various embodiments, the filters of a trained convolutional neural network can be applied to each of the different portions of the newly created electronic message to analyze the text content and the graphics/image content.

In block 270, the neural network can generate possible positive replies that are predicted responses from the listed recipients of the newly created electronic message, where the predicted responses are used for comparison with the newly created electronic message to see whether such message qualifies as a positive reply (i.e, not objectionable for all addresses). The neural network can generate a confidence score that evaluates the likelihood that the newly created electronic message will be acceptable for all listed recipients.

In block 280, the neural network can generate possible negative replies that are predicted responses from the listed recipients of the newly created electronic message, where the predicted responses are used for comparison with the newly created electronic message to see whether such message qualifies as a negative reply (i.e., objectionable for at least one of the addressees). The neural network can generate a confidence score that evaluates the likelihood that the newly created electronic message will be unacceptable for at least one of the listed recipients.

In block 290, actual responses received from the recipients for the newly created electronic message can be compared to the predicted positive responses and the predicted negative responses. Differences between the predicted responses and the actual responses received from the recipients can be used to update the message filter(s). The message filter can be updated by changing the weights of the filter matrix, F, where the message filter can be updated through back propagation.

In various embodiments, the method 200 of a neural network system implementing embodiments of the present approach to preventing or avoiding sending improper messages or sensitive information to receivers through electronic communication channels can be implemented on a cloud computing platform, where the analysis of electronic communications may be done on distributed computer resources. The neural network can be implemented over multiple nodes.

Figure 3:
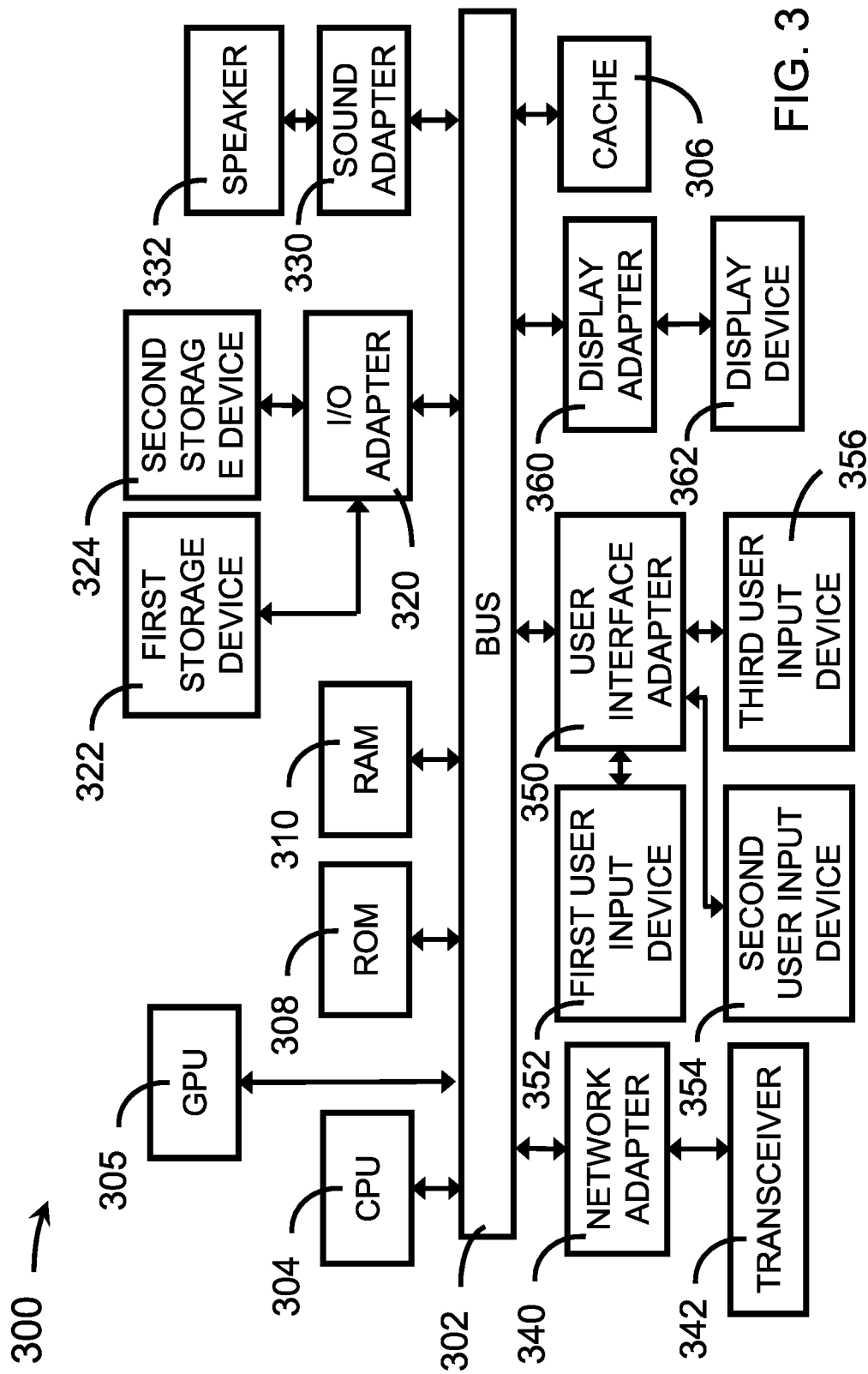
FIG. 3 is an exemplary processing system 300 to which the present methods and systems may be applied, in accordance with an embodiment of the present invention.

FIG. 3 is an exemplary processing system 300 to which the present methods and systems may be applied, in accordance with an embodiment of the present invention.

The processing system 300 can include at least one processor (CPU) 304 and at least one graphics processing (GPU) 305 that can perform vector calculations/manipulations operatively coupled to other components via a system bus 302. A cache 306, a Read Only Memory (ROM) 308, a Random Access Memory (RAM) 310, an input/output (I/O) adapter 320, a sound adapter 330, a network adapter 340, a user interface adapter 350, and a display adapter 360, can be operatively coupled to the system bus 302.

A first storage device 322 and a second storage device 324 are operatively coupled to system bus 302 by the I/O adapter 320. The storage devices 322 and 324 can be any of a disk storage device (e.g., a magnetic or optical disk storage device), a solid state magnetic device, and so forth. The storage devices 322 and 324 can be the same type of storage device or different types of storage devices.

A speaker 332 is operatively coupled to system bus 302 by the sound adapter 330. A transceiver 342 is operatively coupled to system bus 302 by network adapter 340. A display device 362 is operatively coupled to system bus 302 by display adapter 360.

A first user input device 352, a second user input device 354, and a third user input device 356 are operatively coupled to system bus 302 by user interface adapter 350. The user input devices 352, 354, and 356 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 352, 354, and 356 can be the same type of user input device or different types of user input devices. The user input devices 352, 354, and 356 can be used to input and output information to and from system 300.

In various embodiments, the processing system 300 may also include other elements (not shown), as readily contemplated by one of skill in the art, as well as omit certain elements. For example, various other input devices and/or output devices can be included in processing system 300, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 300 are readily contemplated by one of ordinary skill in the art given the teachings of the present principles provided herein.

Moreover, it is to be appreciated that system 300 is a system for implementing respective embodiments of the present methods/systems. Part or all of processing system 300 may be implemented in one or more of the elements of FIGS. 1-2.

Further, it is to be appreciated that processing system 300 may perform at least part of the methods described herein including, for example, at least part of method 100 of FIG. 1 and method 200 of FIG. 2. Processing system 300 may be part of a cloud computing platform.

Figure 4:
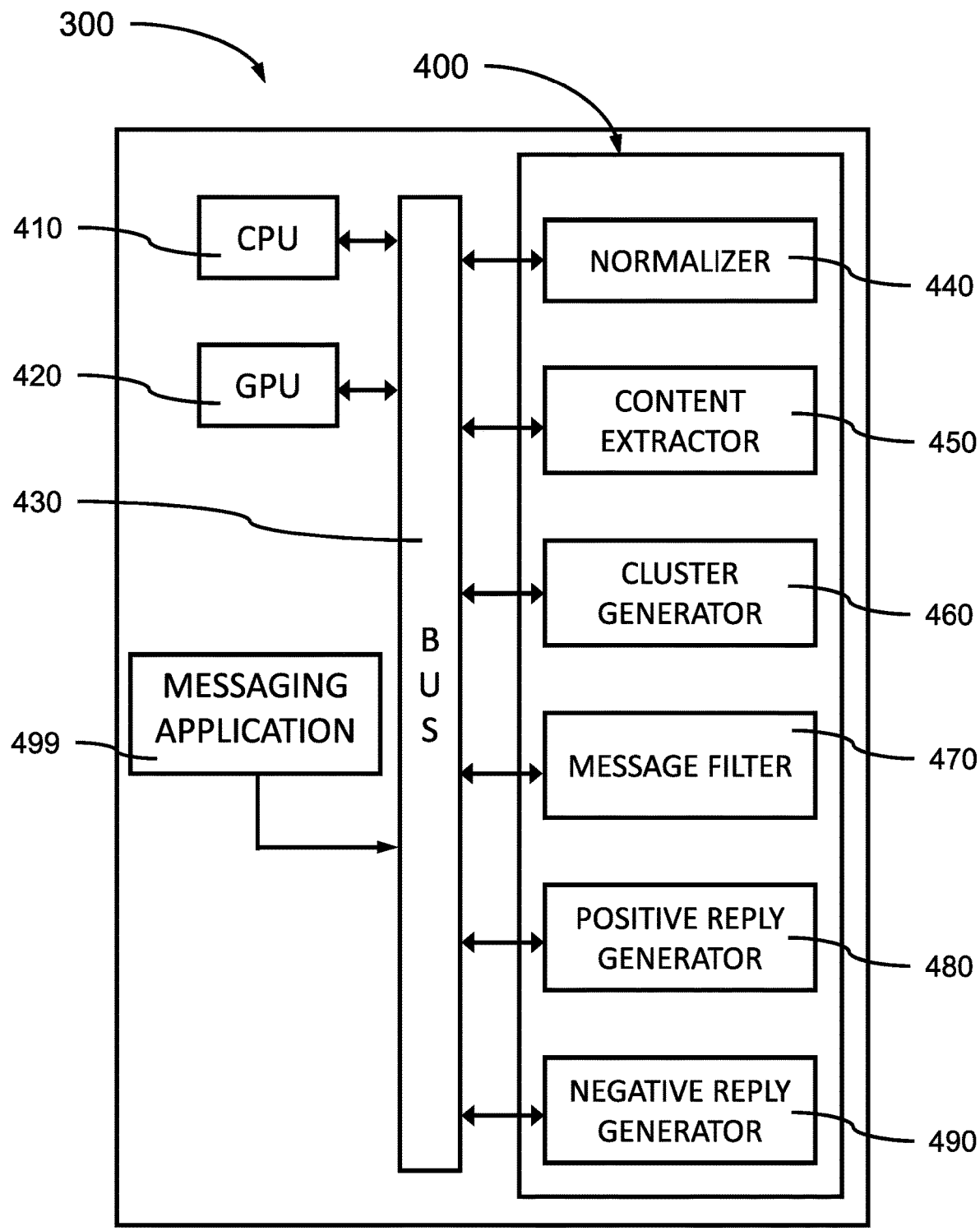
FIG. 4 is a block diagram illustratively depicting an exemplary processing system implementing a neural network for interrupting objectionable electronic message transmissions, in accordance with an embodiment of the present invention.

FIG. 4 is a block diagram illustratively depicting an exemplary processing system implementing a neural network for interrupting objectionable electronic message transmissions, in accordance with an embodiment of the present invention.

In one or more embodiments, the automated prevention of sending objectionable electronic messages can be implemented as a neural network system 400 on a processing system 300, where the processing system can include a CPU 410, a GPU 420, a bus 430 electrically connected to and in electronic communication with the CPU 410 and the GPU 420. The neural network system 400 can be stored in the memory of processing system 300 and run by CPU 410 and/or GPU 420.

In one or more embodiments, a normalizer 440 can be electrically connected to and in electronic communication with the bus 430, where the normalizer 440 can normalize stored electronic messages from a communication history, pre-existing electronic messages of a message thread, and/or a newly created electronic message (collectively referred to as "electronic message(s)") input into the neural network system 400. Normalization can include removing stopwords, correcting or removing mis-spellings and typos, and/or enriching the electronic messages using context information.

In one or more embodiments, a content extractor 450 can be electrically connected to and in electronic communication with the bus 430, where the content extractor 450 can extract content from the electronic message(s) using key term identification and/or LDA.

In one or more embodiments, a cluster generator 460 can be electrically connected to and in electronic communication with the bus 430, where the cluster generator 460 can generate clusters from the content of the electronic message(s) using expectation maximization (EM) approach, a K-means approach (e.g., using MacQueen's algorithm, Hartigan's algorithm, etc.), or a Gaussian Mixture Model.

In one or more embodiments, a message filterer 470 can be electrically connected to and in electronic communication with the bus 430, where the message filterer 470 can filter the electronic messages with or without attachments using black lists, white lists, and/or one or more filter matrices, F, $M_N$, $M_P$.

In one or more embodiments, a positive reply generator 480 can be electrically connected to and in electronic communication with the bus 430, where the positive reply generator 480 can generate one or more possible positive replies that are predicted responses from the listed recipients of a newly created electronic message.

In one or more embodiments, a negative reply generator 490 can be electrically connected to and in electronic communication with the bus 430, where the negative reply generator 490 can generate one or more possible negative replies that are predicted responses from the listed recipients of a newly created electronic message.

In various embodiments, the neural network system 400 can be in electronic communication with a messaging application 499 that can be running on the system 400, where the system can interrupt the sending of a newly created electronic message if the message is determined to contain content that would be objectionable to one or more of the intended recipients listed in the addressee field of the newly created electronic message. The user/sender may be prompted, for example, through a pop-up window on the system, to re-evaluate the message content, the list of addressees listed in the recipient field or both depending on, for example, the message content and/or the identified addressees listed in the recipient field with or without their profile relationships.

The processing system 300 can implement the positively and negatively trained neural network on a communications platform running the messaging application 499, wherein the positively and/or negatively trained neural network system 400 analyzes electronic communications sent using the communications platform and the newly created electronic message(s), and pre-emptively blocks a newly created electronic message identified as containing objectionable material based on the set of corresponding recipients for the newly created electronic message.

Figure 5:
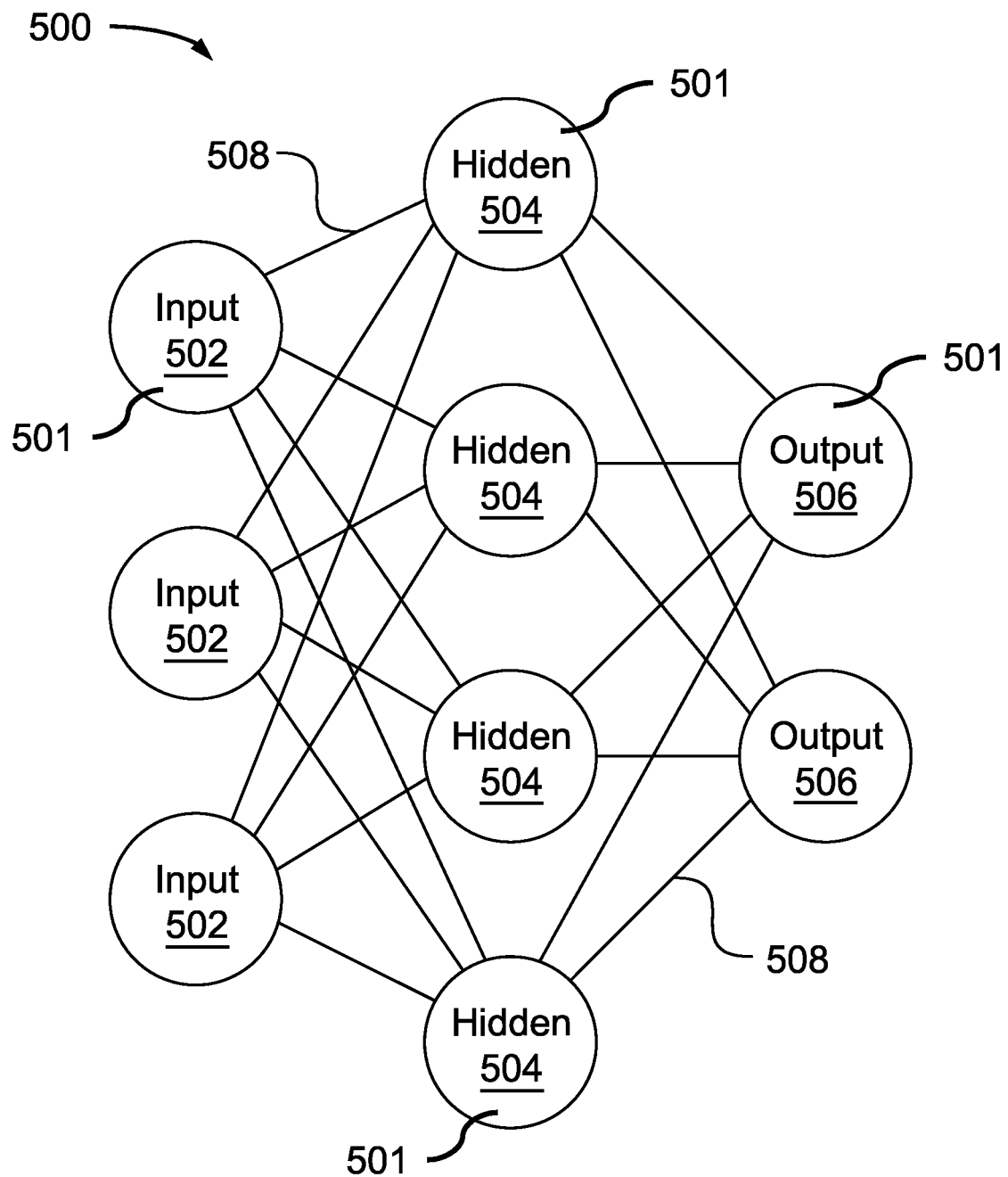
FIG. 5 is a block diagram illustratively depicting an exemplary neural network, in accordance with an embodiment of the present invention.

FIG. 5 is a block diagram illustratively depicting an exemplary neural network, in accordance with an embodiment of the present invention.

ANNs demonstrate an ability to derive meaning from complicated or imprecise data and can be used to extract patterns and detect trends that are too complex to be detected by humans or other computer-based systems. A neural network 500 may include a plurality of neurons/nodes 501, and the nodes 501 may communicate using one or more of a plurality of connections 508. The neural network 500 may include a plurality of layers, including, for example, one or more input layers 502, one or more hidden layers 504, and one or more output layers 506. In an embodiment, nodes 501 at each layer may be employed to apply any function (e.g., input program, input data, etc.) to any previous layer to produce output, and the hidden layer 504 may be employed to transform inputs from the input layer (or any other layer) into output for nodes 501 at different levels.

This represents a "feed-forward" computation, where information propagates from input neurons 502 to the output neurons 506. Upon completion of a feed-forward computation, the output is compared to a desired output available from training data. The error relative to the training data is then processed in "feed-back" computation, where the hidden neurons 504 and input neurons 502 receive information regarding the error propagating backward from the output neurons 506. Once the backward error propagation has been completed, weight updates are performed, with the weighted connections 508 being updated to account for the received error.

Figure 6:
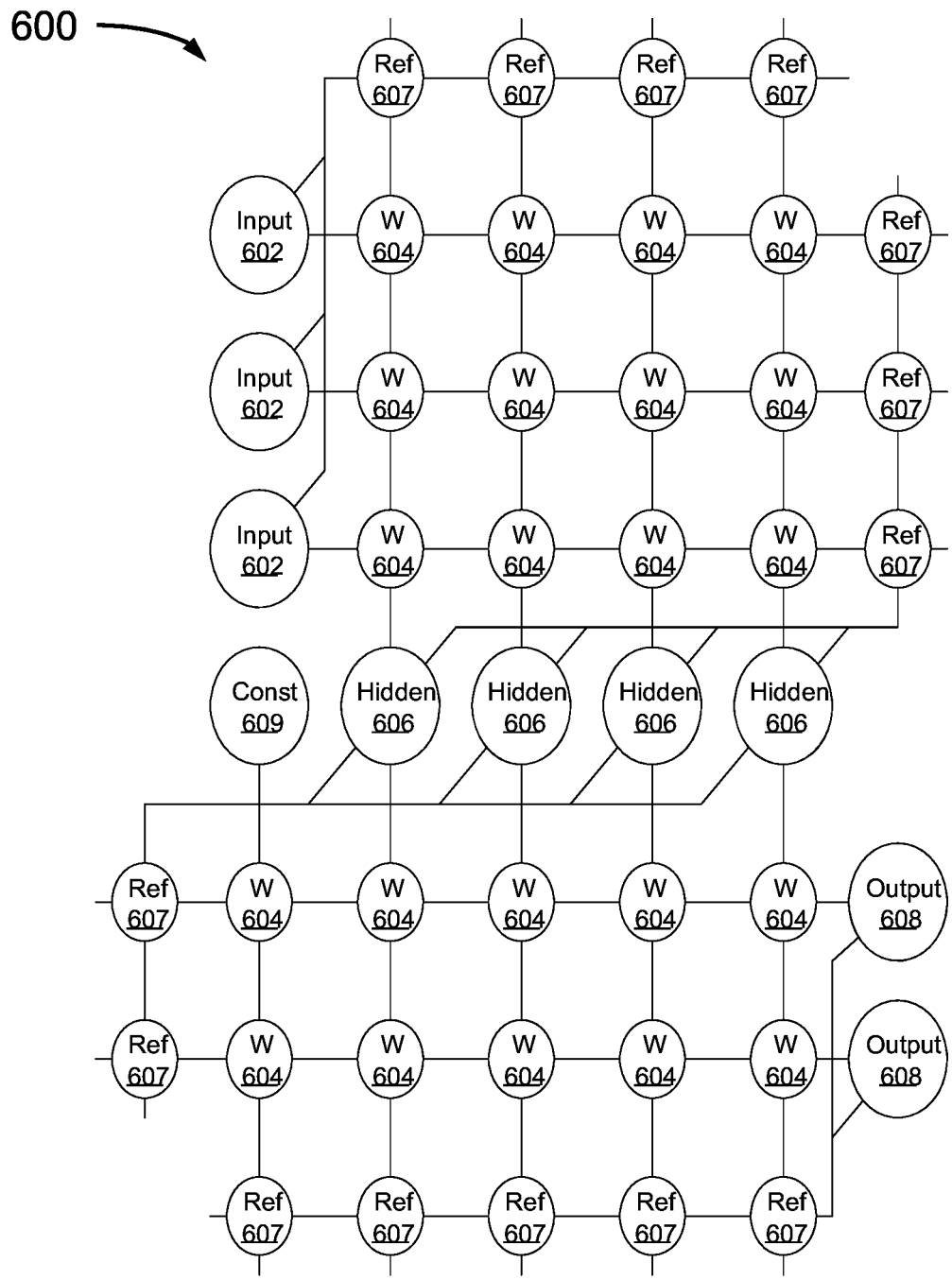
FIG. 6 is a block diagram illustratively depicting an exemplary artificial neural network (ANN) architecture, in accordance with an embodiment of the present invention.

FIG. 6 is a block diagram illustratively depicting an exemplary artificial neural network (ANN) architecture 600, in accordance with an embodiment of the present invention.

It should be understood that the present architecture 600 is purely exemplary and that other architectures or types of neural network may be used instead. During feed-forward operation, a set of input neurons 602 each provide an input voltage in parallel to a respective row of weights 604. The weights 604 each have a settable resistance value, such that a current output flows from the weight 604 to a respective hidden neuron 606 to represent the weighted input. The current output by a given weight is determined as $I=V/r$, where V is the input voltage from the input neuron 602 and r is the set resistance of the weight 604. The current from each weight adds column-wise and flows to a hidden neuron 606. A set of reference weights 607 have a fixed resistance and combine their outputs into a reference current that is provided to each of the hidden neurons 606. Because conductance values can only be positive numbers, some reference conductance is needed to encode both positive and negative values in the matrix. The currents produced by the weights 604 are continuously valued and positive, and therefore the reference weights 607 are used to provide a reference current, above which currents are considered to have positive values and below which currents are considered to have negative values.

As an alternative to using the reference weights 607, another embodiment may use separate arrays of weights 604 to capture negative values. Each approach has advantages and disadvantages. Using the reference weights 607 is more efficient in chip area, but reference values need to be matched closely to one another. In contrast, the use of a separate array for negative values does not involve close matching as each value has a pair of weights to compare against. However, the negative weight matrix approach uses roughly twice the chip area as compared to the single reference weight column. In addition, the reference weight column generates a current that needs to be copied to each neuron for comparison, whereas a negative matrix array provides a reference value directly for each neuron. In the negative array embodiment, the weights 604 of both positive and negative arrays are updated, but this also increases signal-to-noise ratio as each weight value is a difference of two conductance values. The two embodiments provide identical functionality in encoding a negative value and those having ordinary skill in the art will be able to choose a suitable embodiment for the application at hand.

The hidden neurons 606 use the currents from the array of weights 604 and the reference weights 607 to perform some calculation. The hidden neurons 606 then output a voltage of their own to another array of weights 604. This array performs in the same way, with a column of weights 604 receiving a voltage from their respective hidden neuron 606 to produce a weighted current output that adds row-wise and is provided to the output neuron 608.

It should be understood that any number of these stages may be implemented, by interposing additional layers of arrays and hidden neurons 606. It should also be noted that some neurons may be constant neurons 609, which provide a constant voltage to the array. The constant neurons 609 can be present among the input neurons 602 and/or hidden neurons 606 and are only used during feed-forward operation.

During back propagation, the output neurons 608 provide a voltage back across the array of weights 604. The output layer compares the generated network response to training data and computes an error. The error is applied to the array as a voltage pulse, where the height and/or duration of the pulse is modulated proportional to the error value. In this example, a row of weights 604 receives a voltage from a respective output neuron 608 in parallel and converts that voltage into a current which adds column-wise to provide an input to hidden neurons 606. The hidden neurons 606 combine the weighted feedback signal with a derivative of its feed-forward calculation and stores an error value before outputting a feedback signal voltage to its respective column of weights 604. This back propagation travels through the entire network 600 until all hidden neurons 606 and the input neurons 602 have stored an error value.

During weight updates, the input neurons 602 and hidden neurons 606 apply a first weight update voltage forward and the output neurons 608 and hidden neurons 606 apply a second weight update voltage backward through the network 600. The combinations of these voltages create a state change within each weight 604, causing the weight 604 to take on a new resistance value. In this manner the weights 604 can be trained to adapt the neural network 600 to errors in its processing. It should be noted that the three modes of operation, feed forward, back propagation, and weight update, do not overlap with one another.

Figure 7:
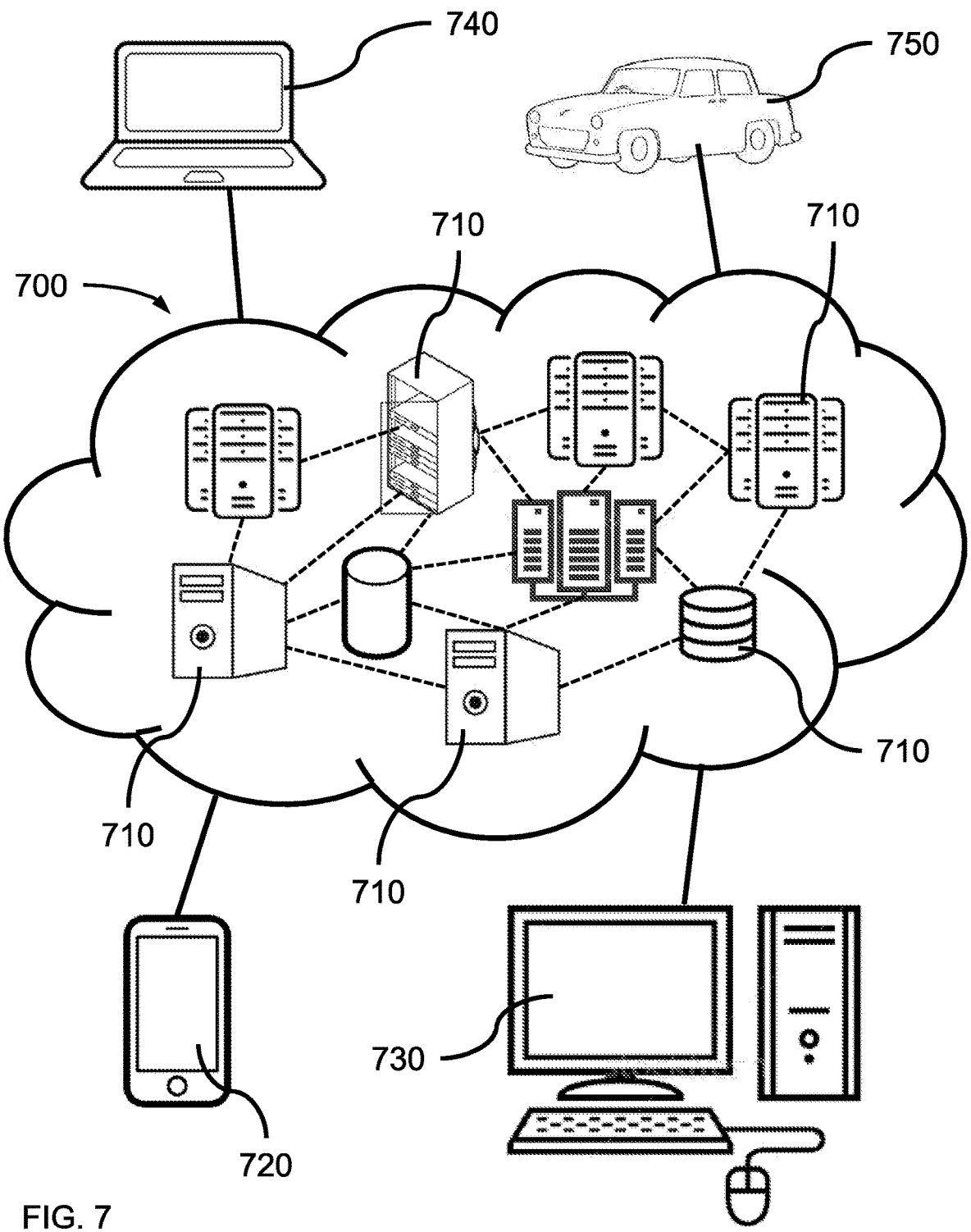
FIG. 7 is an illustration of a cloud computing environment, in accordance with an embodiment of the present invention.

FIG. 7 is an illustration of a cloud computing environment, in accordance with an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

As shown in FIG. 7, cloud computing environment 700 includes one or more cloud computing nodes 710 with which local computing devices used by cloud consumers, such as, for example, personal digital assistant (PDA) or cellular telephone or smartphone 720, desktop computer 730, laptop computer 740, and/or automobile computer system 750 can communicate. Nodes 710 can communicate with one another through wired and/or wireless communication links that form a network (e.g., Internet, WAN, LAN, etc.). The nodes 710 may be grouped (not shown) physically or virtually, in one or more networks, such as Private, Community, Public, or Hybrid clouds as described herein, or a combination thereof. This allows cloud computing environment 700 to offer infrastructure, platforms and/or software as services for which a cloud consumer does not need to maintain resources on a local computing device. It is understood that the types of computing devices 720, 730, 740, 750, shown in FIG. 7 are intended to be illustrative only and that computing nodes 710 and cloud computing environment 700 can communicate with any type of computerized device over any type of network and/or network addressable connection (e.g., using a web browser).

Figure 8:
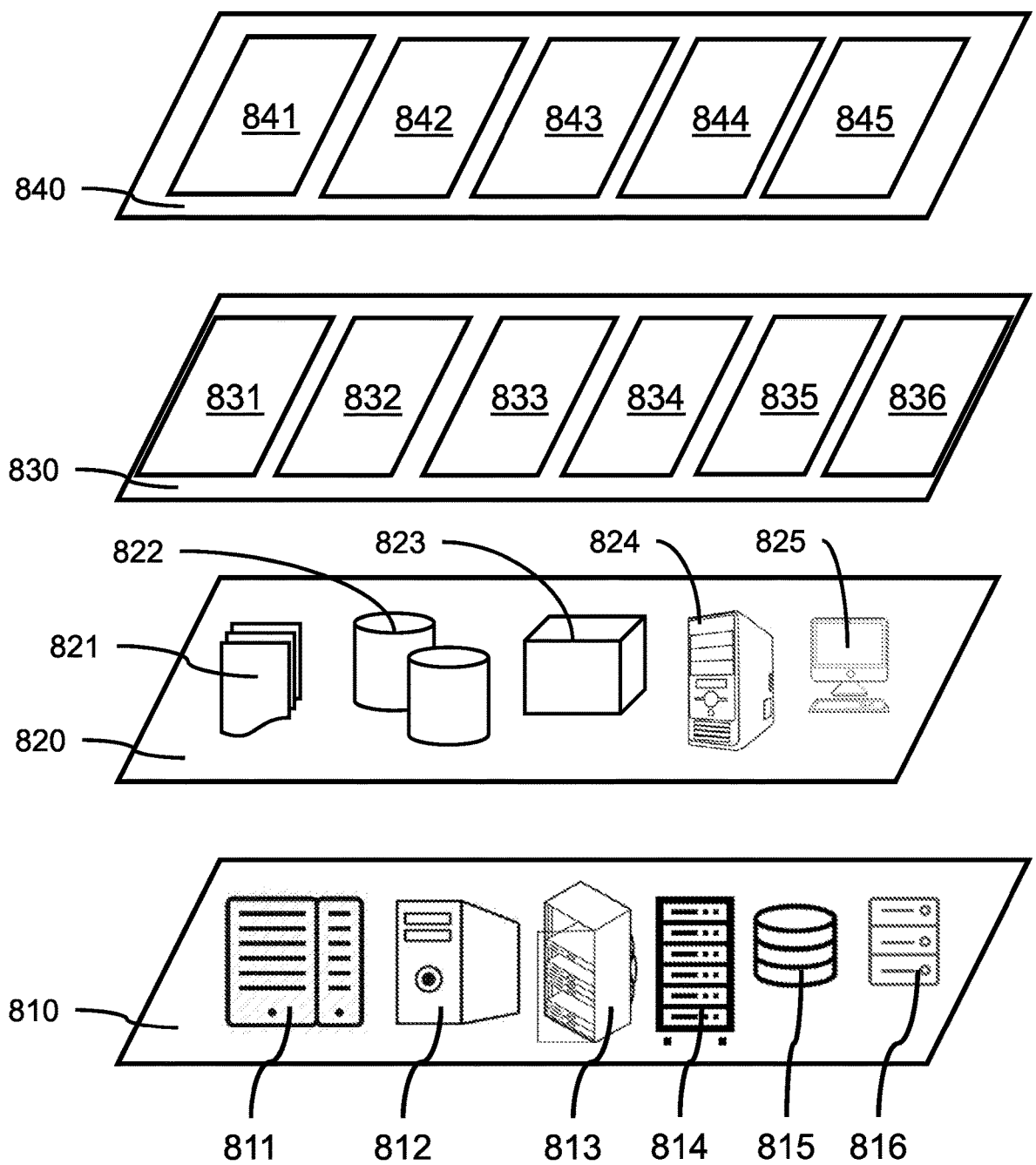
FIG. 8 is an illustration of a set of functional abstraction layers provided by a cloud computing environment 700, as shown in FIG. 7, in accordance with an embodiment of the present invention.

FIG. 8 is an illustration of a set of functional abstraction layers provided by a cloud computing environment 700, as shown in FIG. 7, in accordance with an embodiment of the present invention.

It should be understood in advance that the components, layers, and functions shown in FIG. 8 are intended to be illustrative only and embodiments of the invention are not limited thereto. As depicted, the following layers and corresponding functions are provided:

Hardware and software layer 810 can include hardware and software components. Examples of hardware components include: mainframes 811; RISC (Reduced Instruction Set Computer) architecture based servers 812; servers 813; blade servers 814; storage devices 815; and networks and networking components 816. In some embodiments, software components include network application server software and database software.

Virtualization layer 820 provides an abstraction layer from which the following examples of virtual entities may be provided: virtual servers 821; virtual storage 822; virtual networks 823, including virtual private networks; virtual applications and operating systems 824; and virtual clients 825.

In one example, management layer 830 may provide the functions described below. Resource provisioning 831 provides dynamic procurement of computing resources and other resources that are utilized to perform tasks within the cloud computing environment. Metering and Pricing 832 provide cost tracking as resources are utilized within the cloud computing environment, and billing or invoicing for consumption of these resources. In one example, these resources may include application software licenses. Security 833 provides identity verification for cloud consumers and tasks, as well as protection for data and other resources. User portal 834 provides access to the cloud computing environment for consumers and system administrators. Service level management 835 provides cloud computing resource allocation and management such that required service levels are met. Service Level Agreement (SLA) planning and fulfillment 836 provide pre-arrangement for, and procurement of, cloud computing resources for which a future requirement is anticipated in accordance with an SLA.

Workloads layer 840 provides examples of functionality for which the cloud computing environment may be utilized. Examples of workloads and functions which may be provided from this layer include: mapping and navigation 841; software development and lifecycle management 842; virtual classroom education delivery 843; data analytics processing 844; and electronic communication and electronic message analysis 845.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer implemented method of pre-emptively blocking an electronic communication, comprising:
    inputting an electronic communication history, wherein the electronic communication history includes a plurality of electronic communications and a set of corresponding recipients for each of the plurality of electronic communications;
    normalizing the plurality of electronic communications;
    extracting a topic from each of the plurality of electronic communications;
    clustering the plurality of electronic communications according to the extracted topics;
    digesting the plurality of electronic communications to form a positive learning data set, based on positive responses from the set of corresponding recipients, and a negative learning data set, based on negative responses from at least one recipient in the set of corresponding recipients, to train a neural network;
    training the neural network on the positive learning data set and the negative learning data set;
    preparing a positive neural network model including a positive outcome matrix, $M_P$, to be applied to a newly created electronic message, and a negative neural network model including a negative outcome matrix, $M_N$, to be applied to the newly created electronic message;
    analyzing the newly created electronic message being sent using a communications platform using the positively and the negatively trained neural network models, wherein the analysis generates a confidence score that indicates whether the newly created electronic message contains objectionable subject matter for recipients identified for the newly created electronic message; and
    pre-emptively blocking the newly created electronic message identified as containing material predicted to elicit a negative response from at least one recipient of the newly created electronic message.

2. The computer implemented method of claim 1, wherein the normalization includes removing stop-words, correcting or removing mis-spellings and typos, and/or enriching the electronic messages using the context information.

3. The computer implemented method of claim 2, wherein clustering utilizes expectation maximization (EM) approach, a K-means approach, or a Gaussian Mixture Model.

4. The computer implemented method of claim 3, wherein content extraction utilizes key term identification and/or Latent Dirichlet Allocation (LDA).

5. The computer implemented method of claim 4, wherein the newly created electronic message includes a text portion, a graphics/image portion, or both.

6. The computer implemented method of claim 1, wherein the positive outcome matrix, $M_P$, includes a first plurality of weights, and the negative outcome matrix, $M_N$, includes a second plurality of weights, wherein the first plurality of weights are based on the positive responses from the set of corresponding recipients, and the second plurality of weights is based on the negative responses from at least one recipient in the set of corresponding recipients.

7. A processing system, comprising:
a central processing unit (CPU);
a graphics processing unit (GPU);
a bus electrically connected to and in electronic communication with the CPU and the GPU; and
a neural network system including:
a normalizer configured to normalize stored electronic communications from a communication history, pre-existing electronic communications of a message thread, and/or a newly created electronic message;
a content extractor configured to extract content from the electronic communications and the electronic message using key term identification and/or Latent Dirichlet Allocation (LDA);
a cluster generator configured to generate clusters from the content of the electronic communications and the electronic message; and
a message filterer configured to filter the electronic communications and the electronic message with or without attachments using one or more filter matrices; and
wherein the neural network system is a positively and negatively trained neural network system, including a positive outcome matrix, $M_P$, to be applied to a newly created electronic message and a negative outcome matrix, $M_N$, to be applied to the newly created electronic message, implemented on a communications platform, wherein the positively and negatively trained neural network system analyzes the newly created electronic message being sent using a messaging application of the communications platform to generate a confidence score that indicates whether the newly created electronic message contains objectionable subject matter for recipients identified for the newly created electronic message, and pre-emptively blocks the newly created electronic message found to contain material predicted to elicit a negative response from at least one recipient of the newly created electronic message.

8. The processing system of claim 7, further comprising a positive reply generator configured to generate one or more possible positive replies that are predicted responses.

9. The processing system of claim 8, further comprising a negative reply generator configured to generate one or more possible negative replies that are predicted responses.

10. The processing system of claim 9, further comprising a messaging application run by the CPU, and wherein the positive outcome matrix, $M_P$, includes a first plurality of weights, and the negative outcome matrix, $M_N$, includes a second plurality of weights.

11. The processing system of claim 10, wherein the cluster generator utilizes an expectation maximization (EM) approach, a K-means approach, or a Gaussian Mixture Model.

12. The processing system of claim 11, wherein the newly created electronic message includes a text portion, a graphics/image portion, or both.

13. The processing system of claim 10, wherein the first plurality of weights are based on the positive responses from the set of corresponding recipients, and the second plurality of weights is based on the negative responses from at least one recipient in the set of corresponding recipients.

14. A non-transitory computer readable storage medium comprising a computer readable program for pre-emptively blocking an electronic communication, wherein the computer readable program when executed on a computer causes the computer to perform the steps of:
inputting an electronic communication history, wherein the electronic communication history includes a plurality of electronic communications and a set of corresponding recipients for each electronic communication;
normalizing the plurality of electronic communications;
extracting a topic from each of the plurality of electronic communications;
clustering the plurality of electronic communications according to the extracted topics;
digesting the plurality of electronic communications to form a positive learning data set, based on positive responses from the set of corresponding recipients, and a negative learning data set, based on negative responses from at least one recipient in the set of corresponding recipients, to train a neural network;
training the neural network on the positive learning data set and the negative learning data set;
preparing a positive neural network model including a positive outcome matrix, $M_P$, to be applied to a newly created electronic message, and a negative neural network model including a negative outcome matrix, $M_N$, to be applied to the newly created electronic message;
analyzing a newly created electronic message being sent using a communications platform using the positively and negatively trained neural network, wherein the analysis generates a confidence score that indicates whether the newly created electronic message contains objectionable subject matter for recipients identified for the newly created electronic message; and
pre-emptively blocking the newly created electronic message identified as containing material predicted to elicit a negative response from at least one recipient of the newly created electronic message.

15. The computer readable program of claim 14, wherein the normalization includes removing stop-words, correcting or removing mis-spellings and typos, and/or enriching the electronic messages using the context information.

16. The computer readable program of claim 15, wherein clustering utilizes expectation maximization (EM) approach, a K-means approach, or a Gaussian Mixture Model.

17. The computer readable program of claim 16, wherein content extraction utilizes key term identification and/or Latent Dirichlet Allocation (LDA).

18. The computer readable program of claim 17, wherein the newly created electronic message includes a text portion, a graphics/image portion, or both.

19. The computer readable program of claim 18, further comprising comparing the actual responses received from recipients of the newly created electronic message to predicted positive responses and predicted negative responses, and wherein the positive outcome matrix, $M_P$, includes a first plurality of weights, and the negative outcome matrix, $M_N$, includes a second plurality of weights.

20. The computer readable program of claim 19, wherein the first plurality of weights are based on the positive responses from the set of corresponding recipients, and the second plurality of weights is based on the negative responses from at least one recipient in the set of corresponding recipients.

\* \* \* \* \*